(12) United States Patent
Otani et al.

(10) Patent No.: US 8,395,665 B2
(45) Date of Patent: Mar. 12, 2013

(54) AUTOMATIC TRACKING METHOD AND SURVEYING DEVICE

(75) Inventors: Hitoshi Otani, Itabashi-ku (JP);
Takahiro Komeichi, Itabashi-ku (JP);
Norikazu Ikoma, Kitakyushu (JP);
Kazuhiko Kawamoto, Kitakyushu (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 320 days.

(21) Appl. No.: 12/661,573

(22) Filed: Mar. 19, 2010

(65) Prior Publication Data

US 2010/0245587 A1 Sep. 30, 2010

(30) Foreign Application Priority Data

Mar. 31, 2009 (JP) ................................. 2009-087934

(51) Int. Cl.
*H04N 5/225* (2006.01)
*G06K 9/00* (2006.01)

(52) U.S. Cl. .................... 348/169; 382/103; 348/208.14

(58) Field of Classification Search .................. 348/169, 348/170, 171, 172, 36, 155, E05.024, 208.14; 382/103

See application file for complete search history.

(56) References Cited

U.S. PATENT DOCUMENTS

| | | | |
|---|---|---|---|
| 5,780,839 A * | 7/1998 | Livingston | 250/203.2 |
| 5,973,309 A * | 10/1999 | Livingston | 250/203.1 |
| 6,137,569 A | 10/2000 | Sasaki et al. | |
| 6,153,871 A | 11/2000 | Livingston | |
| 6,198,501 B1 | 3/2001 | Nemiroff et al. | |
| 2002/0024599 A1* | 2/2002 | Fukuhara et al. | 348/169 |
| 2004/0163266 A1 | 8/2004 | Kaneko | |
| 2005/0271248 A1 | 12/2005 | Teku et al. | |
| 2006/0028548 A1 | 2/2006 | Salivar et al. | |
| 2006/0208169 A1* | 9/2006 | Breed et al. | 250/221 |
| 2007/0058717 A1 | 3/2007 | Chosak et al. | |
| 2008/0094480 A1* | 4/2008 | Swarr et al. | 348/211.99 |
| 2009/0028386 A1* | 1/2009 | Michimoto et al. | 382/103 |

(Continued)

FOREIGN PATENT DOCUMENTS

| | | |
|---|---|---|
| EP | 1126414 A2 | 8/2001 |
| EP | 1486969 A2 * | 12/2004 |

(Continued)

OTHER PUBLICATIONS

Bai et al., "Fuzzy logic control to suppress noises and coupling effects in a laser tracking system," Control Systems Technology, IEEE Transactions on, vol. 13, No. 1, pp. 113-121, Jan. 2005.*

(Continued)

*Primary Examiner* — Wing F Chan
*Assistant Examiner* — Kostas Katsikis
(74) *Attorney, Agent, or Firm* — Nields, Lemack & Frame, LLC

(57) ABSTRACT

A method of automatic tracking of a target is disclosed. This method includes a light spot detecting step of detecting a light spot from a target supported on a moving object, a step of taking a moving image of the target and the moving object, a step of target tracking based on the detection of the light spot, a step of performing image tracking based on the moving image in parallel to the target tracking, a step of comparing a position of the target obtained by the target tracking with a position of the image obtained by the image tracking, and a step of tracking the target based on a result of the target tracking in case where the target position and the image position are within a predetermined range.

24 Claims, 9 Drawing Sheets

U.S. PATENT DOCUMENTS

| | | | |
|---|---|---|---|
| 2009/0080701 A1* | 3/2009 | Meuter et al. | 382/103 |
| 2009/0262196 A1 | 10/2009 | Salivar et al. | |
| 2010/0007739 A1 | 1/2010 | Otani et al. | |
| 2010/0027843 A1* | 2/2010 | Wilson | 382/103 |
| 2010/0035217 A1* | 2/2010 | Kasper | 434/21 |
| 2010/0121540 A1 | 5/2010 | Kumagai et al. | |
| 2010/0165112 A1 | 7/2010 | Scanlon et al. | |
| 2010/0239120 A1* | 9/2010 | Hsu | 382/103 |
| 2010/0265331 A1 | 10/2010 | Tanaka | |
| 2010/0321504 A1* | 12/2010 | Miyamaki et al. | 348/169 |

FOREIGN PATENT DOCUMENTS

| | | | |
|---|---|---|---|
| EP | 2 141 450 A1 | | 1/2010 |
| JP | 7-198383 A | | 8/1995 |
| JP | 11271451 A | * | 10/1999 |
| JP | 2000-346645 A | | 12/2000 |
| JP | 2002-131054 A | | 5/2002 |
| JP | 2004-132914 A | | 4/2004 |
| JP | 2004-170354 A | | 6/2004 |
| WO | WO 2008097327 A2 | * | 8/2008 |
| WO | WO 2008142680 A2 | * | 11/2008 |

OTHER PUBLICATIONS

European Communication mailed Nov. 8, 2011 in corresponding European Patent Application No. EP 10156948.1.

International Multimedia Conference-First ACM SIGMM International Workshop on Video Surveillance, Berkeley, CA, Nov. 2-8, 2003, IWVS '03, Nov. 7, 2003, pp. 113-120, XP 002538254, "A Master-Slave System to Acquire Biometric Imagery of Humans at a Distance", Zhou, et al.

Proceedings of the 2006 IEEE International Conference on Robotics and Biomimetics, Dec. 17-20, 2006, Kunming, China, XP 031069007, pp. 1488-1493, "Target Tracking in Colored Image Sequence Using Weighted Color Histogram Based Particle Filter", Zhuang, et al.

European communication dated Aug. 26, 2010 in corresponding foreign application (EP10156948.1).

European Communication dated Sep. 29, 2009 in co-pending European Patent Application No. EP 09008427.8.

Office Action dated Dec. 21, 2011 in co-pending U.S. Appl. No. 12/456,822.

Final Rejection mailed May 1, 2012 in co-pending U.S. Appl. No. 12/456,822.

Notice of Allowance mailed Jul. 24, 2012 in co-pending U.S. Appl. No. 12/456,822.

Miscellaneous Communication mailed Aug. 20, 2012 in co-pending U.S. Appl. No. 12/456,822.

* cited by examiner

AUTOMATIC TRACKING METHOD AND SURVEYING DEVICE

BACKGROUND OF THE INVENTION

The present invention relates to an automatic tracking method and a surveying device having tracking function.

As a surveying device for performing measurement of a distance, a horizontal angle, and a vertical angle, a surveying device having tracking function has been known in the past. In this type of surveying device, the surveying device collimates an object reflector (a target) such as a corner cube via a collimating telescope provided on the surveying device, and projects a tracking light via the collimating telescope. Then, the surveying device receives and detects a reflection light from the target via the collimating telescope and when the target moves, detects a deviation between a photodetecting position of the reflection light (from the target) and a collimation center. Based on the deviation, the surveying device adjusts the collimating direction and tracks the target automatically.

Normally, in a surveying device having the tracking function, no operator is assigned on the surveying device side. The target is supported by a surveying operator, or the target is mounted on a construction machine such as a bulldozer. With the progress of the operation, the target moves and the surveying device tracks the moving target.

However, there may be the cases such as: a case where the moving velocity of the target exceeds a speed of the surveying device to follow and the target is deviated out of the field of view of the collimating telescope, or a case where a reflection light from a reflection object such as a windowpane are projected to the surveying device, or a case where a plurality of targets pass each other and reflection lights from two or more targets enter the surveying device, or a case where a vehicle such as an automobile passes in front of the target and the reflection light is interrupted or other cases. In these cases, the surveying device may miss the target out of sight or may recognize the target by error and cannot track the target, and automatic tracking may be interrupted.

Such conditions are caused from the situations that, in case of general type of the collimating telescope, the field angle (view angle) is as small as about 1° and that detection range of the reflection light for automatic tracking is too small.

When the tracking operation is interrupted, the surveying device starts an operation to search the target. In the searching operation, scanning is performed by rotating the collimating telescope in up and down direction and in left-to-right direction in a predetermined range while the tracking light is projected, and the target is detected.

However, the field angle (view angle) of the collimating telescope is as small as about 1° as described above. In order to re-detect the target, it is necessary to have finer scanning pitch and to increase the number of scanning operations. Therefore, when the tracking is interrupted, much time is required until the time when the target is detected again and the tracking can be started. Further, under the working conditions where the optical path is frequently interrupted by obstacles, the problems may arise that the efficiency of the measuring operation is extremely decreased.

In case where the target is extremely deviated from the field of view of the collimating telescope or other case, the target cannot be detected again and the surveying operation itself may be stopped.

A surveying device having tracking function is disclosed in each of JP-A-7-198383, JP-A-2000-346645, and JP-A-2004-170354.

SUMMARY OF THE INVENTION

It is an object of the present invention to provide a surveying device having tracking function, by which it is possible to prevent erroneous measurement caused by incorrect recognition of the object reflector in case where a plurality of reflection lights are projected, or in case where a reflection light from an object other than the object reflector is detected, and it is possible to quickly re-detect an object reflector, to reduce the time until it is restored to automatic tracking, and to improve the efficiency of the measuring operation in case where the object reflector is missed out of sight.

To attain the above object, the invention provides an automatic tracking method, comprising a light spot detecting step of detecting a light spot from a target supported on a moving object, a step of taking a moving image of the target and the moving object, a step of tracking based on the detection of the light spot, a step of performing image tracking based on the moving image in parallel to the tracking, a step of comparing a position of the target obtained by the tracking with a position of the image obtained by the image tracking, and a step of tracking based on a result of the tracking in case where the target position and the image position are within a predetermined range.

Also, the present invention provides the automatic tracking method as described above, wherein the step of tracking is a step of laser tracking for projecting a laser beam and for detecting the light spot based on a reflection light from the target supported on the moving object.

Further, the present invention provides the automatic tracking method as described above, wherein the step of tracking is a step of tracking a light emitting target for detecting the light spot caused by light emission of the target supported on the moving object.

Also, the present invention provides the automatic tracking method as described above, further comprising a step of continuing the image tracking and performing a target search by projecting the laser beam to a predetermined range based on the image position in case where the target position and the image position are not within a predetermined range, or in case where the light spot is not detected and the target position cannot be obtained.

Further, the present invention provides the automatic tracking method as described above, wherein a template image is extracted from an image of the moving object in the moving image, a histogram is prepared from the template image, and the image tracking is carried out based on the histogram.

Also, the present invention provides the automatic tracking method as described above, wherein the histogram is a histogram of color or lightness. Further, the present invention provides the automatic tracking method as described above, wherein the histogram is a histogram of gradient of edge obtained by edge processing.

Also, the present invention provides the automatic tracking method as described above, wherein particle filtering is used in the image tracking. Further, the present invention provides the automatic tracking method as described above, wherein a multiple of particles are generated around the template image in the particle filtering, and a position of the template image is determined from a weighted average value of the particles. Also, the present invention provides the automatic tracking method as described above, wherein velocity and moving direction of the moving object are judged based on distance measurement data and angle measurement data of the target, and generating positions of the particles to match the movement of the moving object are controlled. Further, the present invention provides the automatic tracking method as described above, wherein generation of the particles is controlled based on a difference between a position of a short time before and a position of the present position or based on a value of likelihood.

Also, the invention provides an automatic tracking method, comprising a step of taking a moving image of a target supported on a moving object and of the moving object, a target tracking step of tracking on the target based on the moving image, a moving object tracking step of tracking on the moving object based on the moving image, a tracking comparing step of comparing a target position obtained from the target tracking step with a position of the moving object obtained from the moving object tracking step, and a step of performing the tracking based on a result of the tracking step in case where the target position and the moving object position are within a predetermined range.

Further, the present invention provides a surveying device, comprising a first image pickup unit for receiving and detecting a reflection light from a target supported by a moving object, a moving image pickup unit for taking moving images of the target and the moving object, a drive unit for shifting collimating direction of the first image pickup unit and the moving image pickup unit to horizontal direction and vertical direction, a light spot detection processing unit for detecting a light spot based on the image from the first image pickup unit, an image tracking processing unit for performing image processing for image tracking based on a picked-up image of the moving image pickup unit, a control arithmetic unit for controlling the drive unit so that the first image pickup unit and the moving image pickup unit are directed toward the target based on the results of processing of the light spot detection processing unit and of the image tracking processing unit, wherein the control arithmetic unit controls the drive unit so that tracking is performed based on the result of detection from the light spot detection processing unit, and so that the image tracking is performed in parallel to the tracking based on the result of processing from the image tracking processing unit.

Also, the present invention provides a surveying device as described above, wherein the tracking is a laser tracking for projecting a laser beam and for detecting a reflection light from the target supported on the moving object.

Further, the present invention provides a surveying device as described above, wherein the tracking is a light emitting target tracking for detecting the light spot based on light emission of the target supported on the moving object.

Also, the present invention provides a surveying device as described above, wherein the control arithmetic unit recognizes the target based on the result obtained by the laser tracking in case where the light spot position obtained by the laser tracking and the image position obtained by the image tracking are within a predetermined range. Further, the present invention provides a surveying device as described above, wherein the control arithmetic unit controls the drive unit so that searching is performed by a laser beam over a predetermined range based on an image position obtained by the image tracking and so that the target is detected in case where the light spot position obtained by the laser tracking and the image position obtained by the image tracking are not within a predetermined range or in case where the light spot position cannot be obtained. Also, the present invention provides a surveying device as described above, wherein the control arithmetic unit has a program for particle filtering processing, and the image tracking processing unit carries out image tracking processing by the particle filtering. Further, the present invention provides a surveying device as described above, wherein the control arithmetic unit extracts a moving object image from an image of the moving image pickup unit, generates a histogram from the moving object image, and identifies the moving object based on the histogram. Also, the present invention provides a surveying device as described above, wherein the control arithmetic unit generates a multiple of particles around the moving object image by the particle filtering and determines image position based on a weighted average value of likelihoods of the particles. Further, the present invention provides a surveying device as described above, wherein the control arithmetic unit judges velocity and moving direction of the moving object based on distance measurement data and angle measurement data and controls generation of particles according to the movement of the moving object. Also, the present invention provides a surveying device as described above, wherein the control arithmetic unit controls generation of particles based on a difference between a position of a short time before and the present position or based on the value of likelihood. Further, the present invention provides a surveying device as described above, wherein the histogram is at least one of a color histogram, a lightness histogram or a histogram of edge gradient.

Also, the present invention provides a surveying device, comprising a first image pickup unit for taking a moving image of a target supported on a moving object, a moving image pickup unit for taking moving images of the target and the moving object, a drive unit for shifting collimating direction of the first image pickup unit and the moving image pickup unit to horizontal direction and to vertical direction, a target tracking image processing unit for performing tracking of the target based on an image from the first image pickup unit, a moving object image tracking processing unit for performing tracking on the moving object based on the moving image, and a control arithmetic unit for controlling the drive unit so that the first image pickup unit the moving image pickup unit are directed toward the target based on a result of processing of the target tracking image processing unit and the moving object image processing unit, wherein the control arithmetic unit controls the drive unit so that tracking of the target is carried out based on a result of detection from the target tracking image processing unit, and so that the tracking on the moving object is carried out in parallel to the target tracking based on a result of processing from the moving object image tracking processing unit.

The present invention provides an automatic tracking method, comprising a light spot detecting step of detecting a light spot from a target supported on a moving object, a step of taking a moving image of the target and the moving object, a step of tracking based on the detection of the light spot, a step of performing image tracking based on the moving image in parallel to the tracking, a step of comparing a position of the target obtained by the tracking with a position of the image obtained by the image tracking, and a step of tracking based on a result of the tracking in case where the target position and the image position are within a predetermined range. As a result, the accuracy of target tracking operation can be improved, and erroneous measurement due to incorrect recognition of the target can be prevented.

Also, the present invention provides the automatic tracking method as described above, further comprising a step of continuing the image tracking and performing a target search by projecting the laser beam to a predetermined range based on the image position in case where the target position and the image position are not within a predetermined range, or in case where the light spot is not detected and the target position cannot be obtained. As a result, it is possible to detect the target promptly and to restore the tracking operation quickly because it is enough to search the vicinity of the image position obtained by image tracking in case where a plurality of light spots are detected or even in case where optical path of the laser beam is interrupted and the light spot cannot be detected.

Further, the present invention provides the automatic tracking method as described above, wherein a template image is extracted from an image of the moving object in the moving image, a histogram is prepared from the template image, and the image tracking is carried out based on the histogram. As a result, even in case where posture of the moving object is changed or even in case where a part of the moving object is interrupted, it is possible to perform image tracking.

Also, the present invention provides the automatic tracking method as described above, wherein velocity and moving direction of the moving object are judged based on distance measurement data and angle measurement data of the target, and generating position of the particles to match the movement of the moving object are controlled. As a result, even in case where the moving object is temporarily hidden behind an obstacle, image tracking can be continued.

Further, the present invention provides the automatic tracking method as described above, comprising a step of taking a moving image of a target supported on a moving object and of the moving object, a target tracking step of tracking on the target based on the moving image, a moving object tracking step of tracking on the moving object based on the moving image, a step tracking comparing of comparing a target position obtained from the target tracking step with a position of the moving object obtained from the moving object tracking step, and a step of performing tracking based on a result of the tracking in case where the target position and the moving object position are within a predetermined range. As a result, it is possible to improve the accuracy of tracking of the target, and to prevent erroneous measurement due to incorrect recognition of the target.

Also, the present invention provides a surveying device, comprising a first image pickup unit for receiving and detecting a reflection light from a target supported by a moving object, a moving image pickup unit for taking moving images of the target and the moving object, a drive unit for shifting collimating direction of the first image pickup unit and the moving image pickup unit to horizontal direction and vertical direction, a light spot detection processing unit for detecting a light spot based on the image from the first image pickup unit, an image tracking processing unit for performing image processing for image tracking based on a picked-up image of the moving image pickup unit, a control arithmetic unit for controlling the drive unit so that the first image pickup unit and the moving image pickup unit are directed toward the target based on the result of processing of the light spot detection processing unit and of the image tracking processing unit, wherein the control arithmetic unit controls the drive unit so that tracking is performed based on the result of detection from the light spot detection processing unit, and so that the image tracking is performed in parallel to the tracking based on the result of processing from the image tracking processing unit. As a result, it is possible to improve the accuracy of tracking of the target, and to prevent erroneous measurement due to incorrect recognition of the target.

Further, the present invention provides the surveying device as described above, wherein the control arithmetic unit controls the drive unit so that searching is performed by a laser beam over a predetermined range based on an image position obtained by the image tracking and so that the target is detected in case where the light spot position obtained by the laser tracking and the image position obtained by the image tracking are not within a predetermined range or in case where the light spot position cannot be obtained. As a result, it is possible to detect the target promptly and to restore the tracking operation quickly because it is enough to search the vicinity of the image position obtained by image tracking in case where a plurality of light spots are detected or even in case where optical path of the laser beam is interrupted and the light spot cannot be detected.

Also, the present invention provides the surveying device as described above, wherein the control arithmetic unit extracts a moving object image from an image of the moving image pickup unit, generates a histogram from the moving object image, and identifies the moving object based on the histogram. As a result, even in case where the posture of the moving object is changed or even in case where a part of the moving object is interrupted by an obstacle, it is possible to perform image tracking.

Further, the present invention provides the surveying device as described above, wherein the control arithmetic unit judges velocity and moving direction of the moving object based on distance measurement data and angle measurement data and controls generation of particles according to the movement of the moving object. As a result, even in case where the posture of the moving object is changed or even in case where a part of the moving object is interrupted by an obstacle, it is possible to perform image tracking.

Also, the present invention provides the surveying device as described above, comprising a first image pickup unit for taking a moving image of a target supported on a moving object, a moving image pickup unit for taking moving images of the target and the moving object, a drive unit for shifting collimating direction of the first image pickup unit and the moving image pickup unit to horizontal direction and to vertical direction, a target tracking image processing unit for performing tracking of the target based on an image from the first image pickup unit, a moving object image tracking processing unit for performing tracking on the moving object based on the moving image, and a control arithmetic unit for controlling the drive unit so that the first image pickup unit the moving image pickup unit are directed toward the target based on a result of processing of the target tracking image processing unit and the moving object image processing unit, wherein the control arithmetic unit controls the drive unit so that tracking of the target is carried out based on a result of detection from the target tracking image processing unit, and so that the tracking on the moving object is carried out in parallel to the target tracking based on a result of processing from the moving object image tracking processing unit. As a result, the accuracy of the tracking of the target can be improved and erroneous measurement due to incorrect recognition of the target can be prevented. Further, even in case where the target is missed out of sight, it is possible to continue the tracking operation, to search the target quickly, and to easily restore the normal target tracking operation.

DETAILED DESCRIPTION OF THE PREFERRED EMBODIMENT

Referring to the attached drawings, description will be given below on an embodiment of the present invention.

Figure 1:
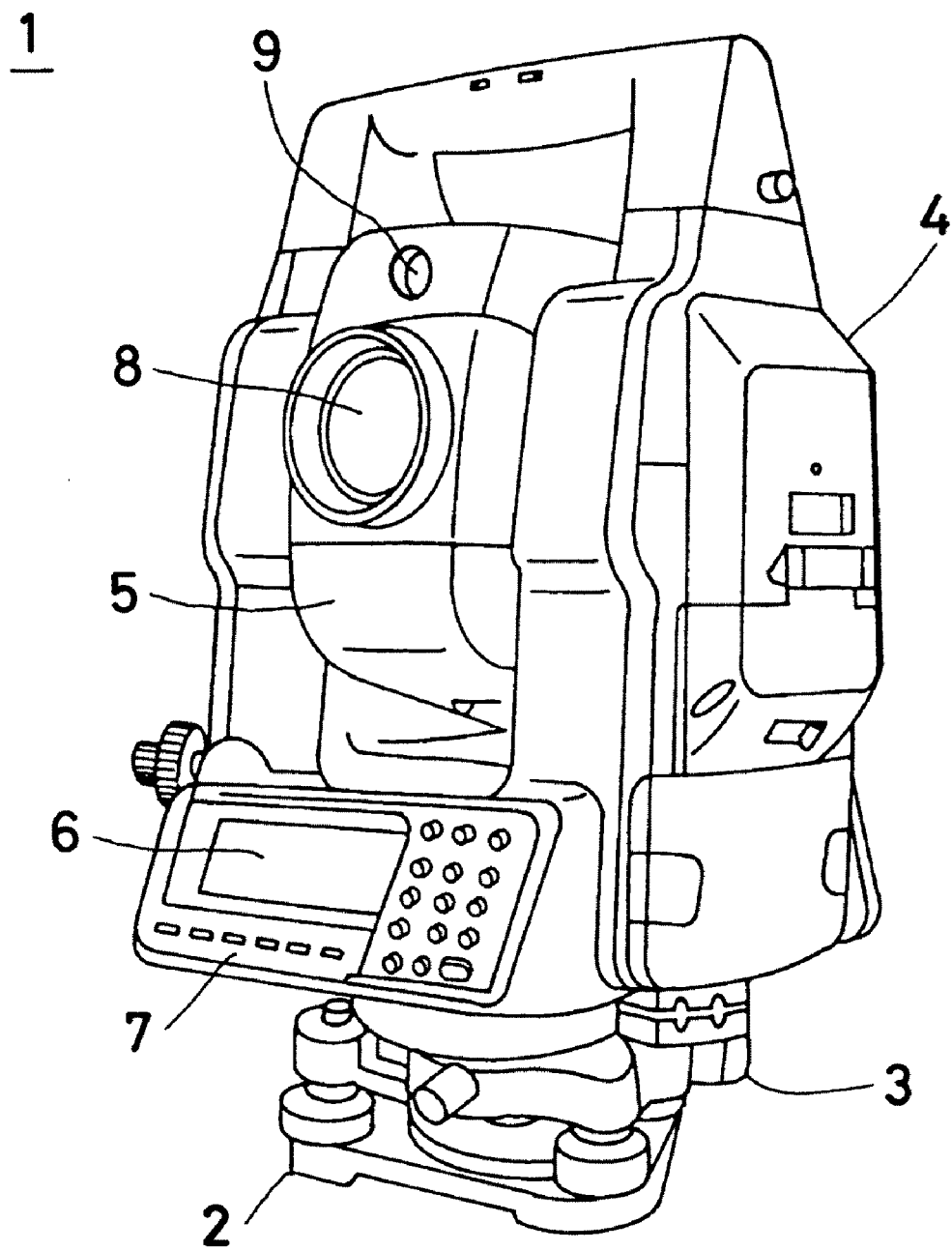
FIG. 1 is a perspective view to show an example of a surveying device, to which the present invention is applied.
Figure 2:
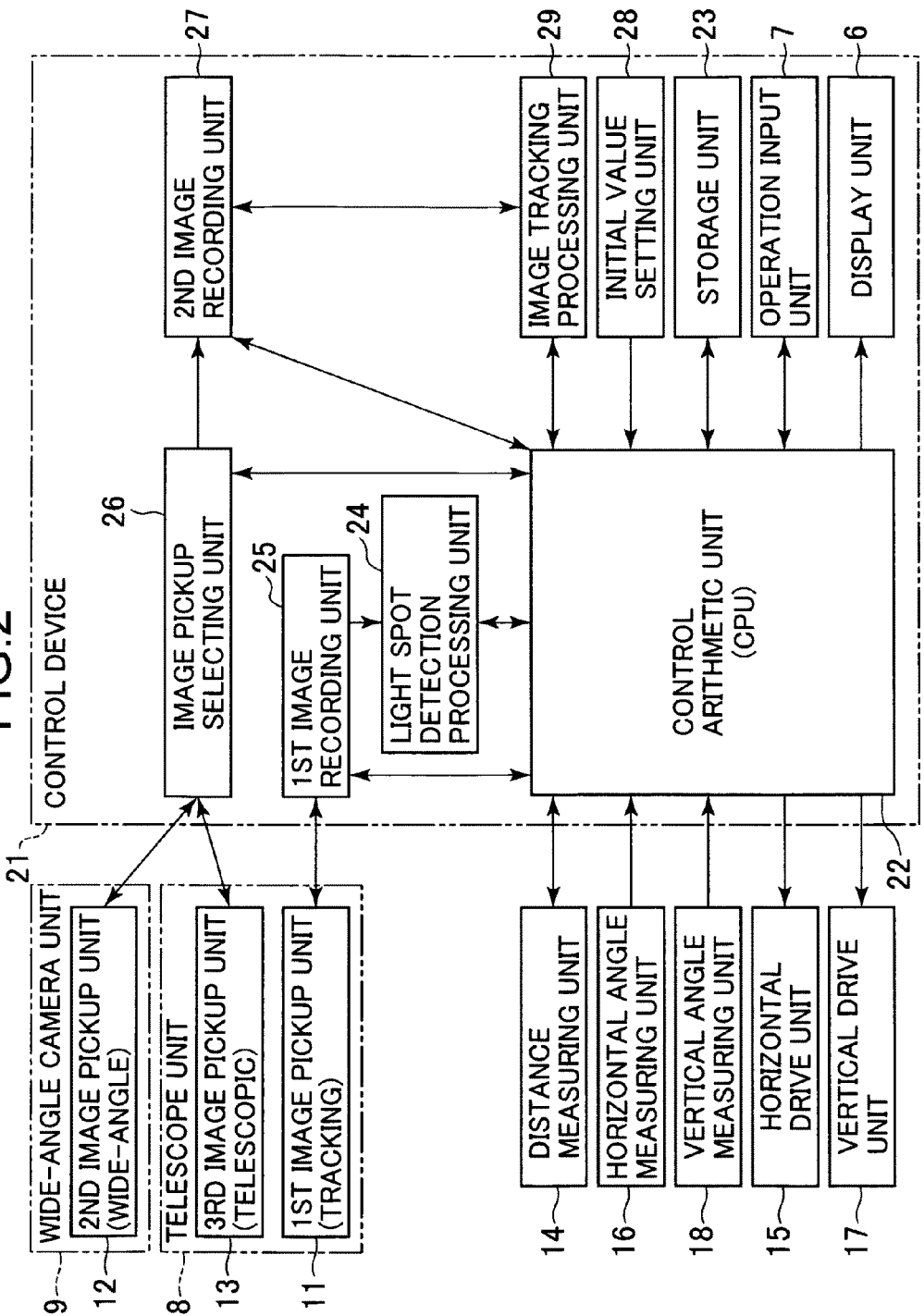
FIG. 2 is a schematical block diagram of the surveying device according to an embodiment of the present invention.

FIG. 1 and FIG. 2 each represents a surveying device 1, in which the present invention is carried out. The surveying device 1 as described here is a total station, for instance. The surveying device 1 projects a pulsed laser beam to a measuring point, receives a pulsed beam reflected from the measuring point, measures a distance for each pulse, averages the results of the distance measurements and carries out distance measurements with high accuracy.

As shown in FIG. 1, the surveying device 1 primarily comprises a leveling unit 2 mounted on a tripod (not shown), a base unit 3 provided on the leveling unit 2, a frame unit 4 rotatably disposed around a vertical axis on the base unit 3, and an optical unit 5 rotatably disposed around a horizontal axis on the frame unit 4.

The frame unit 4 comprises a display unit 6 and an operation input unit 7. The optical unit 5 comprises a telescope unit 8 for collimating an object to be measured, a first image pickup unit (a tracking image pickup unit) 11 for acquiring an image for tracking via an optical system of the telescope unit 8, and a third image pickup unit (a telescopic image pickup unit) 13 for acquiring an image in collimating direction via an optical system of the telescope unit 8. The telescope unit 8 has high magnification, and a field angle of the telescope unit 8 is 1°, for instance.

The optical unit 5 has a wide-angle camera unit 9, which has a magnification lower than a magnification of the telescope unit 8 and a field of view wider than a field of view of the telescope unit 8. The wide-angle camera unit 9 can acquire a wide-angle image in collimating direction or in approximately collimating direction of the telescope unit 8, and the wide-angle camera unit 9 has a second image pickup unit (a wide-angle image pickup unit) 12 to acquire a wide-angle image. A field angle of the wide-angle camera unit 9 is in a range of 15° to 30°, for instance. An optical axis of the telescope unit 8 is different from an optical axis of the wide-angle camera unit 9, while these optical axes run in parallel to each other, and a distance between the two optical axes is already known. A deviation in collimating direction between the wide-angle camera unit 9 and the telescope unit 8 can be adjusted by calculation.

The third image pickup unit 13 acquires an image of an object to be measured (a target) via the telescope unit 8 and can pick up an image within a range as required (field angle) 1° around the optical axis (collimating optical axis) of the telescope unit 8. The first image pickup unit 11 is disposed on an optical path, which is given by dividing the optical axis of the telescope unit 8 and can pick up images in a range equivalent to the field angle of the telescope unit 8, i.e. a range of a field angle of 1°, for instance.

The second image pickup unit 12 is incorporated in the wide-angle camera unit 9 and can pick up images in a range wider than a range of the third image pickup unit 13, e.g. a range of a field angle of 30°. Each of the second image pickup unit 12 and the third image pickup unit 13 takes a moving image in a range including a target, and an object or a human operator to hold a target.

For the first image pickup unit 11, the second image pickup unit 12 and the third image pickup unit 13, a digital camera is used, for instance, in which a pickup image is outputted as a digital image signal. A photodetection element, with which each of the first image pickup unit 11, the second image pickup unit 12, and the third image pickup unit 13 is provided, is an aggregate of pixels, such as CCD, CMOS, etc. By the photodetection element, a position of each of the pixels detected can be specified, and a field angle can be obtained from the position of each of the detected pixels. An image to be taken by the second image pickup unit 12 or the third image pickup unit 13 is preferably a color image.

Now, referring to FIG. 2, description will be given on a basic arrangement of the surveying device 1.

The optical unit 5 incorporates a distance measuring unit 14, which commonly shares the optical system with the telescope unit 8. The distance measuring unit 14 projects a distance measuring light and receives and detects a reflected light from an object to be measured and performs electro-optical distance measurement to the object to be measured.

The distance measuring unit 14 can be changed over to a prism measurement mode when the object to be measured is a prism and to a non-prism measurement mode when the object is not a prism.

The frame unit 4 is provided with a horizontal drive unit 15 for rotating the frame unit 4 in horizontal direction, and the frame unit 4 is also provided with a horizontal angle measuring unit 16 for detecting a horizontal rotation angle of the frame unit 4 with respect to the base unit 3 and also for detecting a horizontal angle in collimating direction. Also, the frame unit 4 is provided with a vertical drive unit 17 for rotating the optical unit 5 around the horizontal axis, and a vertical angle measuring unit 18 for detecting a vertical angle of the optical unit 5 and for measuring a vertical angle in collimating direction.

A control device 21 is incorporated in the frame unit 4. The control device 21 controls driving of the horizontal drive unit 15 and the vertical drive unit 17, rotates the frame unit 4 and the optical unit 5 in horizontal direction and in vertical direction to turn the optical unit 5 in a predetermined direction. Also, the control device 21 scans over a predetermined range, controls switchover of the telescope unit 8 and the wide-angle camera unit 9, and controls switchover of the first image pickup unit 11, the second image pickup unit 12 and the third image pickup unit 13 and acquires an image with a magnification as required. Further, the control device 21 controls the distance measuring unit 14 and determines a distance to a predetermined measuring point.

The control device 21 comprises a control arithmetic unit 22, a storage unit 23, a light spot detection processing unit 24, a first image recording unit 25, an image pickup selecting unit 26, a second image recording unit 27, an initial value setting unit 28, an image tracking processing unit 29, the display unit 6, the operation input unit 7, etc.

Various types of programs are stored in the storage unit 23. These programs include: a calculation program necessary for the measurement, an image processing program for performing a first image processing (to be described later), a prism distance measuring program for selecting a measuring point from the processed image (a light spot to detect a light reflected from mirror) and for executing distance measurement on the selected measuring point (a target), a non-prism distance measuring program for measuring distance without using prism, a program for executing distance measurement according to the non-prism measurement mode, etc. Further, the programs are included such as: a sequence program for tracking the measuring point, a search program for searching a target when the target is missed, an image tracking program for recognizing an object including the light spot as an image and for tracking the image of the object, a particle filtering processing program, and other programs.

The results of the measurements from the distance measuring unit 14, the horizontal angle measuring unit 16, and the vertical angle measuring unit 18 are inputted to the control arithmetic unit 22. Measurement of the distance, and measurements of horizontal angle and the vertical angle are performed, and the results of the measurements are stored in the storage unit 23 via the control arithmetic unit 22 and are displayed on the display unit 6.

The control arithmetic unit 22 judges a velocity and a direction of a moving object from distance measurement data and angle measurement data (H and V) in order to control image tracking of the moving object (moving object tracking) based on the moving image as to be described later.

A measuring operator collimates the object to be measured (a prism) by the telescope unit 8 and selects and sets an object including the object to be measured (a prism) from an image acquired from the second image pickup unit 12 or the third image pickup unit 13. The object thus selected and set will be an object of image tracking. Further, a characteristic part of the selected object is selected and is set up as a template.

The image pickup selecting unit 26 switches over the second image pickup unit 12 and the third image pickup unit 13 to acquire data depending on a distance to the object to be measured so that an image with an adequate magnification to match the measured distance can be acquired.

The second image pickup unit 12 or the third image pickup unit 13 is selected by the image pickup selecting unit 26. Then, an image taken by the image pickup unit thus selected is stored in the second image recording unit 27 and is displayed on the display unit 6 as appropriate.

Based on the image stored in the second image recording unit 27, the object is identified according to the image data by the image tracking processing unit 29, and a position of the object is obtained based on the image data.

The first image pickup unit 11 acquires an image in collimating direction during the measurement, and the image is stored in the first image recording unit 25. From the image stored in the first image recording unit 25, a light spot from the object to be measured is detected through image processing at the light spot detection processing unit 24. Then, from a position of a barycenter of the light spot (a position of a pixel on the photodetection element), a position of the target, i.e. a horizontal angle and a vertical angle in collimating direction of the telescope unit 8, are determined. Based on the light spot thus obtained, tracking operation, i.e. a target tracking, is executed.

On the object thus set up, the image tracking processing unit 29 carries out automatic tracking processing by using a state estimation method (particle filtering) based on the moving image and obtains a histogram 34 to indicate features of the object on the template. As the histogram 34, there are: a histogram of color, a histogram of lightness (subjective brightness), a histogram of gradient of each site of edges obtained through edge processing of the image, etc. (In the figure, a color histogram is shown).

The image tracking processing unit 29 generates a multiple of particles around the template image in the particle filtering. Then, the image tracking processing unit 29 extracts the object based on the histogram 34 from the image data and judges whether it is the object or not. According to a weighted average value of the particles, the image tracking processing unit 29 obtains a position of the object in case where it is judged as the object. Further, based on the velocity and the direction of the moving object estimated by calculation, the image tracking processing unit 29 controls generating positions of particles in the particle filtering to match the movement of the moving object, and performs other processing.

First, referring to FIG. 3, description will be given on general concept of the tracking according to the embodiment.

According to the present embodiment, tracking operation is performed on the object to be measured by carrying out a laser tracking and an image tracking in parallel. The laser tracking is to perform tracking by projecting a tracking light from the surveying device 1 and by detecting a reflection light when the tracking light is reflected by an object reflector (a prism). The image tracking is to set up a template image with respect to the object to be measured and an object to support the object to be measured and to perform tracking based on the template image.

Figure 3:
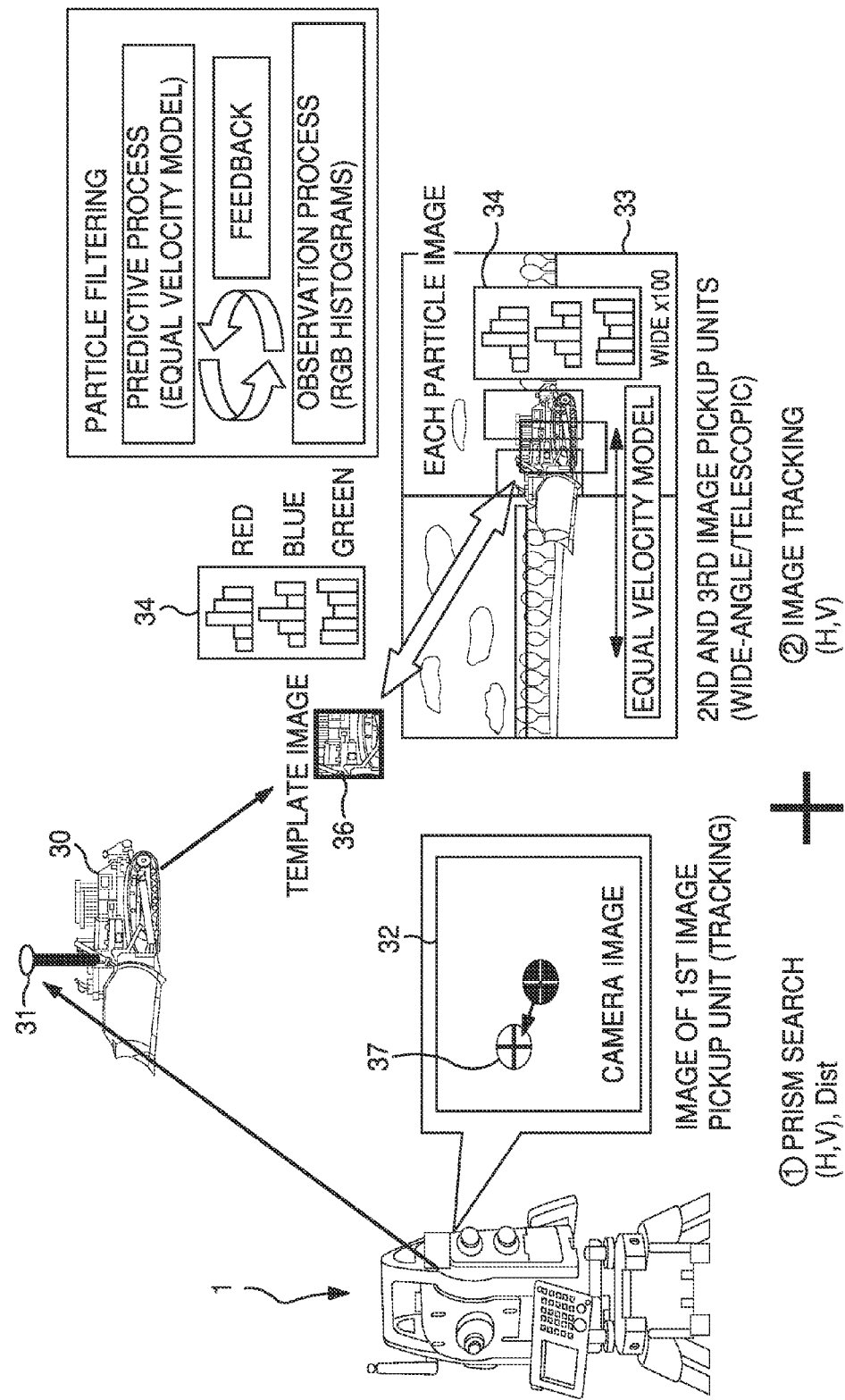
FIG. 3 is an illustrative drawing to explain a tracking operation in the embodiment of the present invention.

In FIG. 3, the object of tracking is a bulldozer 30, which is a moving object, and the object to be measured (a target) 31 is a prism such as a corner cube. The target 31 is supported on the bulldozer 30 via a support member such as a pole.

In the present embodiment, a laser tracking and an image tracking are performed in parallel. The laser tracking is to project a tracking light (a laser beam) along the same optical axis as optical axis of the distance measuring light from the telescope unit 8 and to perform tracking by detecting the laser beam reflected from the target 31. The image tracking is to perform tracking based on a moving image taken by the second image pickup unit 12 and the third image pickup unit 13.

Here, the field angle of the telescope unit 8 used for the laser tracking is as small as 1°, and the range of image pickup by the first image pickup unit 11 is limited to a predetermined range with the optical axis of the telescope unit 8 as a center. A field angle of the third image pickup unit 13 to take the image via the telescope unit 8 is 1°. A view angle of the wide-angle camera unit 9 is wider than a view angle of the telescope unit 8, and the field angle of the second image pickup unit 12 is 30°, for instance.

In FIG. 3, reference numeral 32 denotes an image of a first image pickup unit for the laser tracking, numeral 33 represents an image of the second image pickup unit for image tracking and an image of the third image pickup unit for image tracking, i.e. the images 33 for image tracking. Reference numeral 36 represents a template image, which is obtained by extracting a part of image of the bulldozer 30, i.e., a part of the object image by using the bulldozer 30 as the object, and the size of the template image 36 is set in a size of 20×20 pixels at minimum, for instance. A position of the template image 36 and a position of the target 31 are known on the image, and the center of the target 31 and the center of the object image can be calculated from a position of the center of the template image 36.

The laser tracking and the image tracking are performed in parallel at real time, and a final tracking is carried out based on the result obtained by the laser tracking. The results of tracking by the laser tracking and the image tracking are compared with each other at real time, and it is checked whether the results of the laser tracking are correct or not.

In case where the light spot 37 is deviated from a searching range of the laser tracking during the laser tracking operation, for example, in case where the light spot 37 is deviated from the range over which the first image pickup unit 11 can take the image, that is, the light spot 37 is deviated from the image 32 of the first image pickup unit and the target is missed, or in case where the reflection light from the target 31 is interrupted by an obstacle, or in case where a plurality of light spots are detected and it is impossible to carry out the laser tracking, tracking operation is shifted to the image tracking based on the moving image as acquired by the second image pickup unit 12 or the third image pickup unit 13. Which of the image of the second image pickup unit 12 or the third image pickup unit 13 is to be selected is determined according to the measured distance.

The image tracking is performed, and a site to match the template image 36 is detected in the image, and the center position of the matching site is obtained. Based on the center position of the matching site, a position of the target 31 on the image can be calculated. Then, scanning by the tracking light is performed in a predetermined range with the calculated position of the target 31 as a center, and the light spot 37 is detected. The tracking operation by the image tracking is carried out until the light spot 37 is detected. When the light spot 37 is detected, the laser tracking is started again.

Next, description will be given on the features of the image tracking in the present embodiment.

In the image tracking of the present embodiment, the state estimation method (particle filtering) by a moving image (video) is adopted. An object reflector (a target 31) or a moving object including the target (i.e. an object such as a heavy machine, a human operator, etc.) is tracked. Even when the target 31 is missed out of sight due to situations such as masking (hiding), intersecting, vibration, etc., the moving object integrated with the target can be detected by the image tracking.

The state estimation method as described above is a method to perform tracking processing by using time series data of the moving image or the like. The state estimation method comprises a system (movement) model to describe the changes over time of the state and an observation model to describe a process of observation on particles. The moving object is tracked while feedback control is performed. A multiple of particles are generated around an object to be tracked, and a position of an image of the object can be obtained as a weighted average value of likelihoods (amount of features) of the particles. Based on the position of the image, the moving object is finally recognized by prism searching.

As a result, a range to search the target 31 can be limited to a narrower range, and the target 31 can be detected quickly. The time required to restore to automatic tracking operation in the surveying operation can be reduced, and the working efficiency can be improved.

Because the object is detected and identified according to the "histogram", which is based on color of the moving object or on density gradient (edge) of the image or the like, the moving object can be identified in stable manner even in case of the state of the moving object such as change of scale, partial concealment (hiding), change of direction of the moving object, etc. As the histograms to be used for the detection and the judgment of the object, one or two or more histograms are used out of histogrames; the color histogram, the lightness histogram, or the histogram of edge gradient. By using a plurality of histograms, the accuracy of detection and judgment can be increased.

Figure 4:
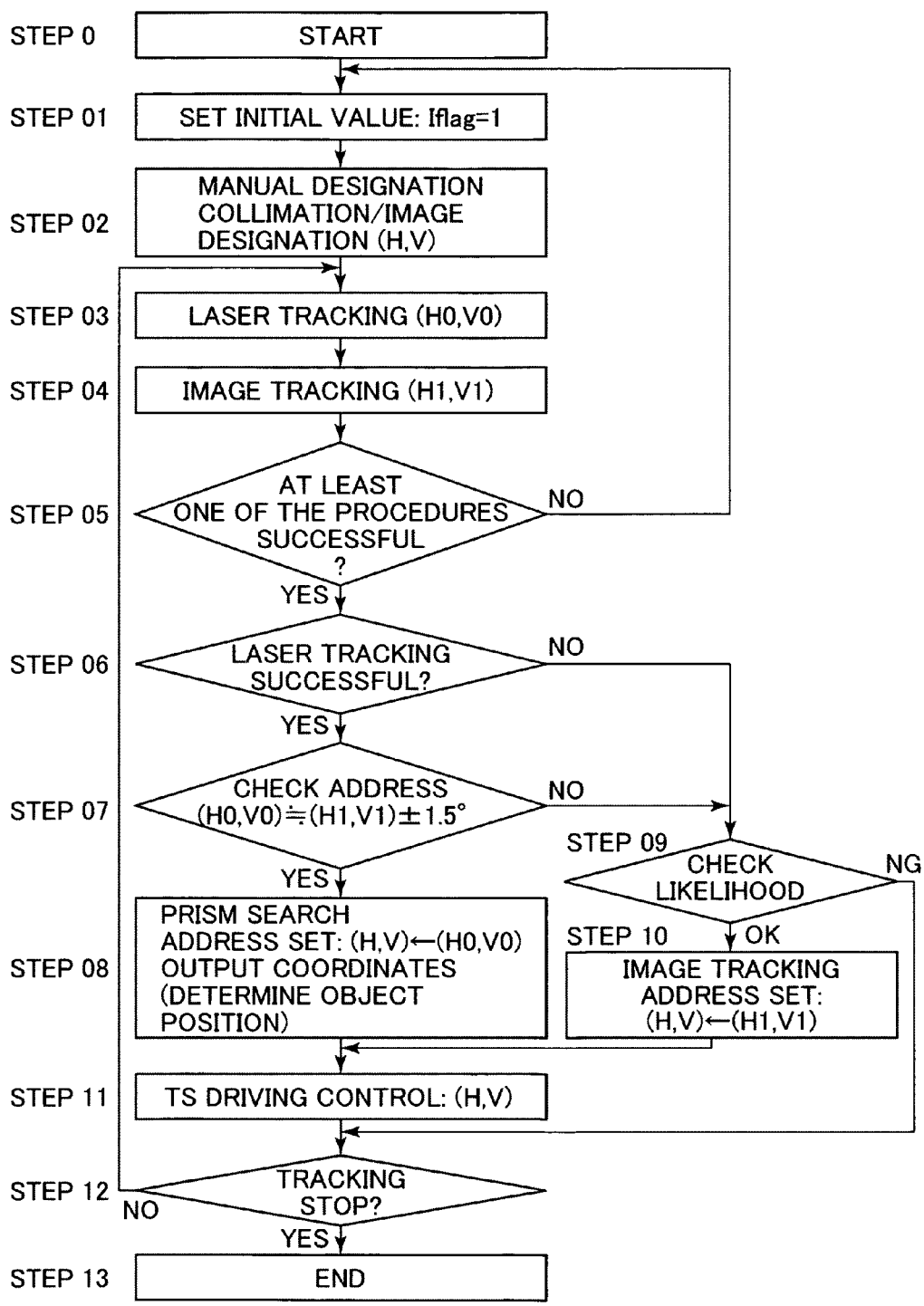
FIG. 4 is a flow chart to show an operation in the embodiment of the present invention.

FIG. 4 shows a flow of tracking operation in the present embodiment. The laser tracking and the image tracking are performed in parallel.

(Step 0, Step 01 and Step 02) To start the tracking, the measuring operator collimates the target 31 via the telescope unit 8 and sets up a horizontal angle (H) and a vertical angle (V) as initial values. The measuring operator confirms a bulldozer 30 (an object) to support the target 31, and sets the template image 36.

(Step 03 and Step 04) The laser tracking and the image tracking are carried out in parallel. In the image tracking, a method of moving image tracking using particle filtering (hereinafter referred as "PF") is adopted.

(Step 05) When at least one of the laser tracking and the image tracking is successfully performed, tracking operation is continued. If both of the tracking operations are without success, initial setting on manual is performed again.

(Step 06 and Step 07) When it is judged that the laser tracking has been successfully performed or not, and in case where it is judged that the laser tracking has been successfully performed, the position (a horizontal angle H0 and a vertical angle V0) of the target 31 and a position of the image center (a horizontal angle H1 and a vertical angle V1) are compared with each other, and it is checked whether these two positions are within a certain predetermined field angle or not, e.g. within 1.5° or not.

(Step 09 and Step 10) In case where the laser tracking is not successfully performed, e.g. in case where a reflected tracking light is interrupted by an obstacle, the result of the image tracking is adopted (to be described later).

In case where the laser tracking has been successfully performed, and the position of the target 31 (the horizontal angle H0 and the vertical angle V0) and the position of the image center (the horizontal angle H1 and the vertical angle V1) are within the predetermined field angle, it is a case where the laser tracking and the image tracking are matching well with each other, and it is confirmed that the object, for which the tracking has been successfully performed, is the target 31.

(Step 08 and Step 11) The position of the target 31 is confirmed as (H0, V0) and the horizontal drive unit 15 and the vertical drive unit 17 are driven, and the telescope unit 8 is collimated to the target 31.

(Step 09) In case where the position of the target 31 and the position of the image center are not within the predetermined field angle, it is possible that other prism or other reflector may have been detected, and the likelihood of PF in the image tracking is checked. If the likelihood is higher than the predetermined value, it is in a state where the particles are concentrated on the template image 36, and it is judged that the object, for which the image tracking has been successfully performed, is the object. In this case, the position of the image center (the horizontal angle H1 and the vertical angle V1) is confirmed as the position of the target 31 (Step 10).

(Step 11) The horizontal drive unit 15 and the vertical drive unit 17 are driven, and collimation is performed on the target 31 so that the horizontal angle and the vertical angle of the telescope unit 8 will be H1 and V1 respectively.

Although the center position of the template image 36 and the position of the target 31 are different from each other, the relation between the templete image 36 and the target 31 is already known. Accordingly, when the center position of the template image 36 is obtained, the position of the target 31 is also promptly determined. When the target 31 is searched by a laser beam with the position thus determined as a center, the target 31 can be easily detected, and the laser tracking can be re-started and continued.

(Step 09) When the likelihood is lower than the predetermined value, it is in a state where particles are dispersed on the image 33 for image tracking. It is insufficient to judge that the object of the image tracking is the object (bulldozer 30). Thus, searching operation is stopped, and it must be waited until the likelihood will become higher than the predetermined value. When the likelihood reaches the predetermined value, it is advanced to Step 10 and Step 11.

Also, in case where there are two or more targets 31, the target 31, which is the object, can be identified, and even in case where the reflected tracking light is interrupted, the tracking operation can be continued.

Figure 5:
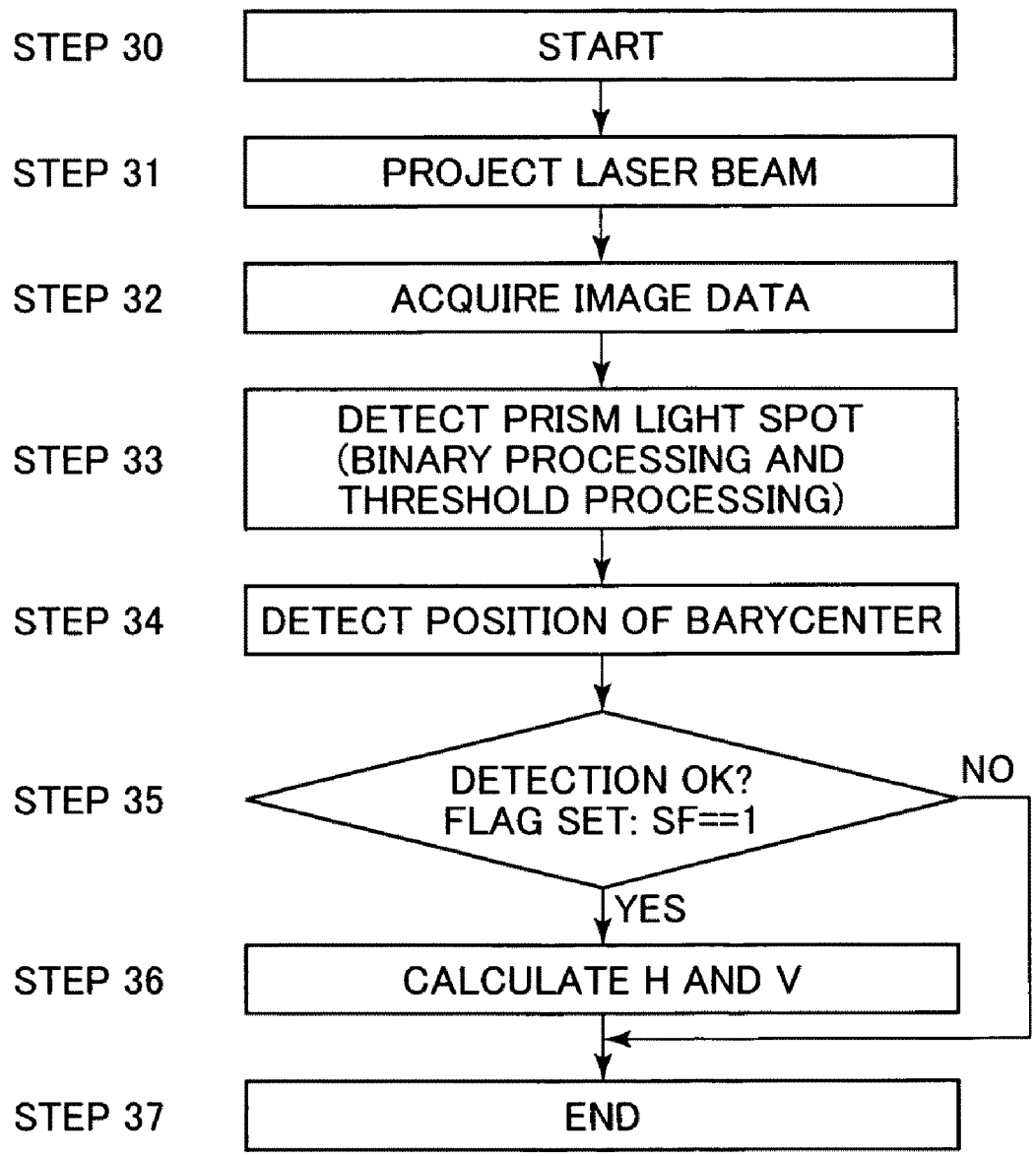
FIG. 5 is a flow chart of a laser tracking operation in the embodiment of the present invention.

Next, referring to FIG. 5, description will be given on the laser tracking in Step 03.

(Step 30, Step 31 and Step 32) A laser beam (a tracking light) is projected via the telescope unit 8. A reflection laser beam reflected by a target is received and detected via the telescope unit 8. An image is taken by the first image pickup unit 11, and an image data is acquired.

(Step 33 and Step 34) Binary processing is performed on the acquired image by a predetermined threshold value. A light spot of the laser beam is detected, and the position of the barycenter of the light spot 37 in the photodetection element in the first image pickup unit 11 is detected.

(Step 35 and Step 36) When the position of the barycenter has been successfully detected, field angles in horizontal and vertical directions at the first image pick up unit 11 can be determined from positions of pixels of the photodetection element to match the position of the barycenter of the light spot 37, and a horizontal angle H and a vertical angle V are calculated.

Figure 6:
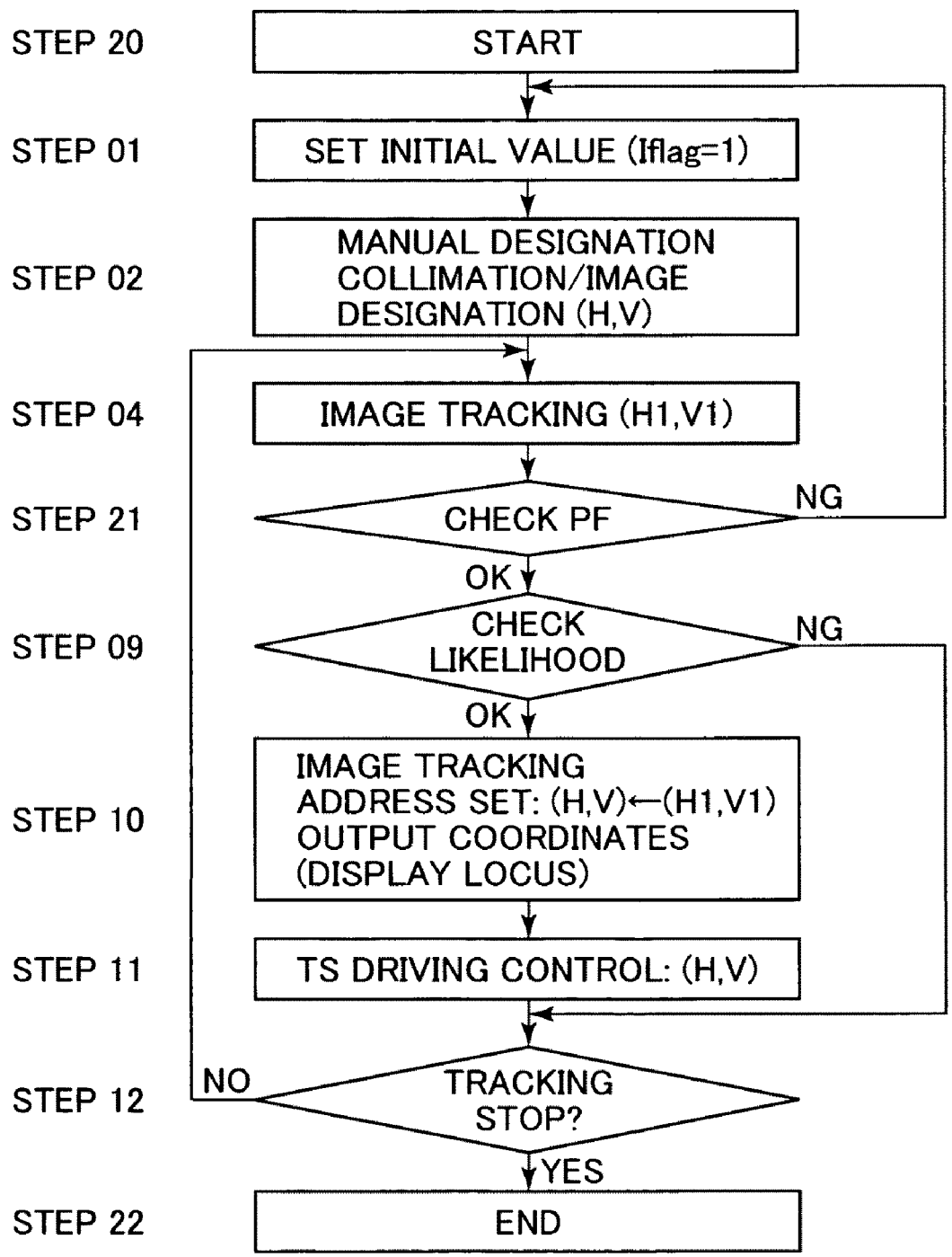
FIG. 6 is a flow chart of an image tracking operation in the embodiment of the present invention.

FIG. 6 shows a flow of object tracking as extracted from FIG. 4. In FIG. 6, for the steps to match the steps shown in FIG. 4, detailed description is not given here.

When the image tracking is carried out in Step 04 and the image center is obtained, it is checked whether the setting of PF is adequate or not. If PF is not adequate, the resetting of PF is performed (Step 21). The image tracking will be described later.

When the checking of PF has been completed, the procedures of Step 10 to Step 12 are carried out, and tracking is performed based on the results of the image tracking.

Figure 7:
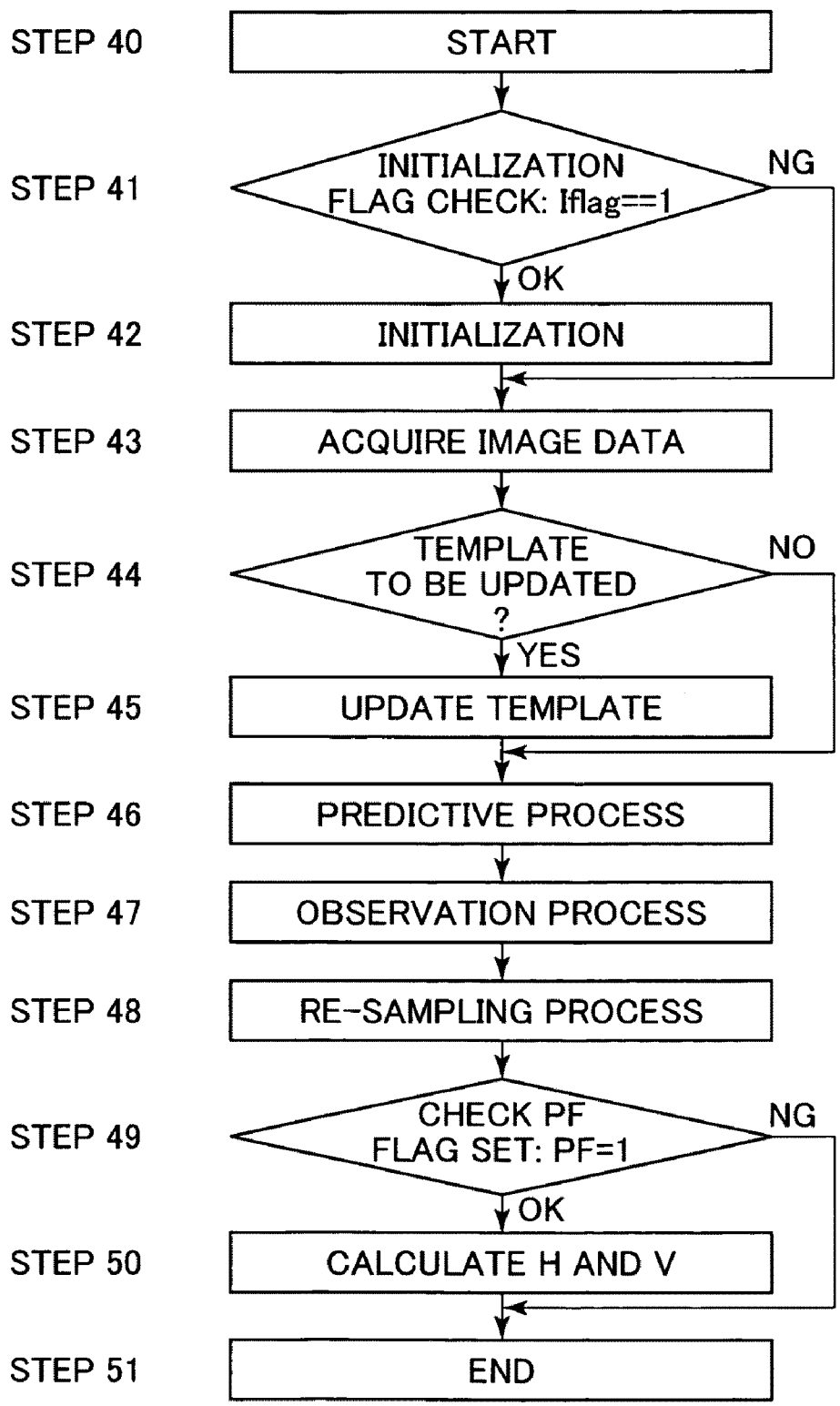
FIG. 7 is a flow chart of an image tracking operation in the embodiment of the present invention.

Now, referring to FIG. 7, description will be given on the image tracking.

Here, description will be given on a flow of the moving image tracking using the state estimation method (particle filtering (PF)).

The particle filtering is an algorithm, in which the state possible to occur from the present moment to the next moment is represented by a multiple of particles, a partial image of the object to be detected is regarded as a template, and the tracking is repeatedly performed while estimating the position based on the amount of features (likelihoods) between all particles set around the object and the template as a state of the next moment.

(Step 40) A tracking program based on the particle filtering is started.

(Step 41) An initialization flag as set by a prism tracking (see FIG. 4) or an object tracking (see FIG. 6) is checked. When the flag is TRUE (1), initialization of the particle filtering is performed (Step 42). When the flag is FALSE (0), initialization is not performed, and it is advanced to the procedure of image data acquisition (Step 43).

(Step 42) By using the particle filtering processing, an initial value to perform the image tracking is set up. Almost all of the parameters to be used in the particle filtering are calculated by using random number according to Gaussian distribution. It is assumed here that the range of numerical values is: −1.0 to 1.0, and this random number is expressed as "NN" in the description given below.

An initial template position (cx_init, cy_init) is a position of a first template, and the initial template position is collimated by the surveying device 1 or after collimating, the initial template position is designated on an image taken by the second image pickup unit 12 of the wide-angle camera unit 9 or by the third image pickup unit 13 of the telescope unit 8.

The initial template size (temple_width, temple_height) is about 20×20 pixels at minimum, for instance. With the designated image position as a center, the image data of the size as set up is acquired. Further, a color histogram and a histogram of image density gradient (edge) in the subsequent observation process are calculated in advance.

Next, aspect ratio of initial template (temple_ratio= temple_height/temple_width) is calculated. Aspect ratio is calculated when the template size (temple_width, temple_height) is updated.

The number of particles is set to 2,000, for instance. A serial number (index) is given to each particle, and the likelihood of each particle (to be described later) is updated and managed.

In the initialization process, it is assumed that 2,000 particles as originally set are at the same position (cx_init, cy_init) in order that difference is given to each of initial particles—all in the same state, and these particles are dispersed in the range of: {(Gaussian distribution)×(searching region)}.

In the initialization process, it is not known as to which direction the particles are advancing in the initial state. Therefore, initial velocity distribution according to normal distribution is given to the particles. That is, positions at the present moment and a position of one step before are calculated, and velocity vector is generated from those two positions. First, a position at the present moment can be obtained by the Formula 1.

$$\begin{pmatrix} cx \\ cy \end{pmatrix} = \begin{pmatrix} cx\_init \\ cy\_init \end{pmatrix} + \begin{pmatrix} NN \times cx\_dev \\ NN \times cy\_dev \end{pmatrix} \quad \text{[Formula 1]}$$

Here, cx_dev and cy_dev are parameters to control the position (spreading) of the particles. For instance, an object moving extensively is given as: cx_dev=cy_dev=10.0. Also, an object moving less extensively is given as: cx_dev=cy_dev=1.0. In the initialization process, cx_dev and cy_dev are set to 10.0.

A position, which is regarded as the position of one step before (cx_prev, cy_prev) can be obtained by the following formula:

$$\begin{pmatrix} cx\_prev \\ cy\_prev \end{pmatrix} = \begin{pmatrix} cx\_init \\ cy\_init \end{pmatrix} + \begin{pmatrix} NN \times cx\_dev \\ NN \times cy\_dev \end{pmatrix} \quad \text{[Formula 2]}$$

Variation (dispersion) is given to the size of the region, w, ratio, to which each particle refers.

$$\begin{pmatrix} w \\ ratio \end{pmatrix} = \begin{pmatrix} temple\_width \\ temple\_ratio \end{pmatrix} + \begin{pmatrix} NN \times w\_dev \\ NN \times r\_dev \end{pmatrix} \quad \text{[Formula 3]}$$

Here, w_dev is used in the state transition of the particle, and w_dev is a dispersion value to indicate movable grade in lateral direction of the region of the particles. For instance, it is set to: w_dev=0.5. Also, r_dev is used in the state transition of the particle, and r_dev is a dispersion value to indicate movable grade in longitudinal direction of the region of the particles. For instance, it is set as: r_dev=0.02.

(Step 43) At the manual designation in Step 02 (see FIG. 4), according to a distance value to the object, the second image pickup unit 12 of the wide angle camera unit 9 and the third image pickup unit 13 of the telescope unit 8 are changed over, and the image is selected so that the object will be in an adequate size to match the distance value, and the moving image (video) data of the object is acquired.

(Step 44) In case where the distance value to the object is changed, for instance, by about 25 to 30% or in case where the value of likelihood (to be described later) is lower than a certain threshold value (e.g. 50% or lower) and in other cases, it is judged that updating of the template is necessary, and it is advanced to Step 45 (template updating).

(Step 45) After the brightness (luminosity) of the camera has been adjusted to an adequate value, a template image data is acquired from an object image of a still picture (a certain frame) of the camera. The size of the template image is set to 20×20 pixels at minimum. Boundary and contour of color of the designated object are extracted and set up. The template is updated based on the measurement data as appropriate. Specifically, the size of the object image is changed according to the distance to the moving object, and the size of the template is also changed to match the change of the size of the object image.

(Step 46) On the particles, which were dispersed in the initialization process, a position of each particle is moved according to predictive distribution (system model). However, in the first prediction process, the values (cx, cy, cx_prev, cy_prev) generated in the initialization are used.

As an example of the system model, "equal velocity model" is used to accomplish the control of smooth moving of the moving object. Specifically, velocity and moving direction are calculated based on the changes of distance measurement data and angle measurement data (H, V). It is assumed here that the velocity at this moment is equal velocity. When the "equal velocity model" as given above is used, it can be defined as follows:

Equal velocity model:

$$X_{t-1}-X_{t-2} \approx X_t - X_{t-1} \Rightarrow \Rightarrow \Rightarrow X_t = 2X_{t-1} - X_{t-2} + N(\sigma)$$

The value of N (σ) is a system dispersion value and represents a searching region, and it is given by the formula 4.

$$\begin{pmatrix} NN \times \text{cx\_dev} \\ NN \times \text{cy\_dev} \end{pmatrix}$$ [Formula 4]

A random number as given in the Formula 5 is used when Gaussian distribution is generated:

$$\begin{pmatrix} cx \\ cy \end{pmatrix} = 2 \times \begin{pmatrix} cx \\ cy \end{pmatrix} - \begin{pmatrix} \text{cx\_prev} \\ \text{cy\_prev} \end{pmatrix} + \begin{pmatrix} NN \times \text{cx\_dev} \\ NN \times \text{cy\_dev} \end{pmatrix}$$ [Formula 5]

As a result, for each of the particles dispersed a short time before, the state transition can be performed according to equal velocity distribution based on Gaussian distribution.

Because it is considered that the shorter the distance to the moving object is, the longer the moving distance will be presented on the image, and the longer the distance to the moving object is, the shorter the moving distance will be presented on the image in normal case, a parameter to control positions (spreading) of the particles (i.e. cx_dev, cy_dev) is changed based on the value of the distance measured by the surveying device 1. Specifically, as the control to match of the velocity of the object, a difference between the position of a short time before and the present position is obtained, and this difference is substituted in the value (cx_dev, cy_dev). Further, in case where the moving object is masked (hidden), or in other cases, the control of the camera of the surveying device 1 is temporarily stopped from the value of likelihood, and the value (cx-dev, cy_dev) is changed and controlled.

In case where the sum of the likelihoods of the present moment is 10% or higher in comparison with the sum of the likelihoods when PF is satisfactory (PF flag FALSE), the difference as given above is inputted. If the value is lower, it is set to: 0% to 3%: cx_dev=cy_dev=30.0; 3% to 5%: cx_dev=cy_dev=20.0; and 5% to 10%: cx_dev=cy_dev= 10.0.

Also, values are given at random for the region w, ratio, to be referred by each particle (Formula 6).

$$\begin{pmatrix} w \\ \text{ratio} \end{pmatrix} = \begin{pmatrix} w \\ \text{ratio} \end{pmatrix} + \begin{pmatrix} NN \times \text{w\_dev} \\ NN \times \text{r\_dev} \end{pmatrix}$$ [Formula 6]

The system model is to describe the changes over time of the state. In a case other than the equal velocity model as described here, in case where the movement of the moving object is known already, its behavior can be controlled. For instance, in case where the object is moving from the right to the left, it can be defined that the generation of the particles can be predicted in right direction and the particles can be preferentially generated.

(Step 47) The observation process is a step to carry out likelihood calculation of particles and normalization of likelihood. Here, image processing of the template and each particle is performed, and the amount of features (similarity) are evaluated, and its value is regarded as the likelihood. The similarity is evaluated by a method using color (RGB) histogram. As the amount of features, SSDA (Sequential Similarity Detection Algorithm), normalized cross correlation method, least square matching method, direction encoding method, etc. may be used. However, in case where a moving object is tracked, it is desirable in many cases to use calculation of the amount of features by adopting the histogram in order to ensure robustness of the change in direction, the change in size, and partial concealment or the like.

1) Likelihood Calculation of Particles

For each particle, likelihood (similarity) with the object is calculated. For the likelihood calculation, evaluation is made on each of all particles by using the RGB histogram. The histograms of the object and each particle are normalized in advance. Normalized histogram (p, q) is defined as follows:

ρ[p,q]=Σ√(pq) (ρ: Bhattacharyya coefficient)

Similarity: dif=√(1−ρ[p,q])

Likelihood=exp (−dif/obs_var)

(where obs_var: observation system dispersion value)

Density gradient (edge) of the image is extracted by using Sobel operator or the like with respect to the template and each particle, and the gradient of edge (i.e. inclinations of the edges on the image) is determined. After discretization (e.g. division to 16 parts), the inclinations of the edges are turned to histogram. By calculating the histogram in a manner similar to a color histogram, not only color information of the object but also shape (edge) can be identified as the amount of features. By simultaneously using color information and information on shape, the performance characteristics of the likelihood can be further improved.

2) Normalization of Likelihood

Normalization is performed so that the sum of likelihoods is to be 1. Or, instead of normalization, a sum of the likelihoods of all particles may be calculated.

(Step 48) Re-sampling is performed on the particles according to probability (weighting), and particles based on predictive process (system model) are generated. That is, with the probability in proportion to the likelihood of each of the particles, new particles are sampled with replacement. As a result, it is possible to increase the number of particles with higher likelihood and to eliminate the particles with lower likelihood.

Figure 8:
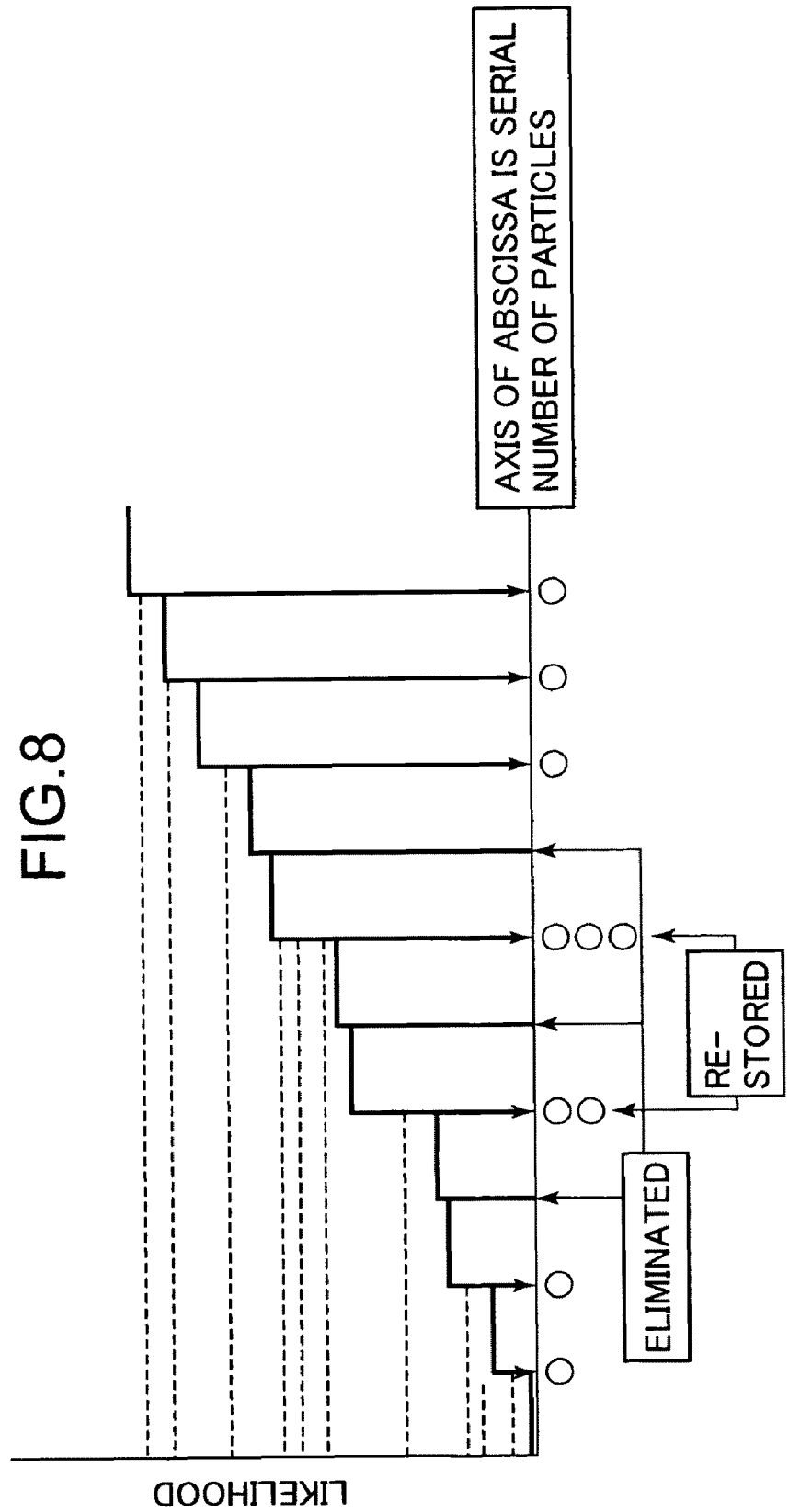
FIG. 8 is a graphic representation to show a state of likelihood in particle filtering.

General re-sampling methods are as follows:
Normalization of likelihood
Cumulative calculation of likelihood
Sampling with replacement using inverse function By cumulative calculation of likelihoods, a step-like graph as shown in FIG. 8 can be depicted. By re-sampling with replacement using inverse function, random numbers of 0 to 1.0 are generated. By regarding these values as the values on the axis of ordinate, correspondent values on the axis of abscissa are induced. In the next step, particles having these obtained values on the axis of abscissa as particle number are generated. This procedure is repeated by 2,000 times. In FIG. 8, the axis of ordinate indicates the likelihood. Because the likelihood is normalized, the maximum value will be 1.0.

In the general particle filtering processing, coordinates of the particle after the re-sampling is set to cx_prev, cy_prev. Then, it is advanced to the predictive process of Step 46, and the processing is repeated.

(Step 49) The value of the likelihood and the number of the particles as obtained above are checked. In case where the likelihood and the number of particles are smaller than a certain threshold, the PF flag is set to TRUE (1). For instance, in case where the sum of the likelihoods at the present moment is 1/10 (i.e. 10%) or lower in comparison with the sum of the likelihoods when PF is in satisfactory condition (i.e. PF flag FALSE), it is judged that the moving object has been missed out of sight or the moving object cannot be confirmed. Then, the flag is turned on, and the camera of the surveying device 1 is turned to be in a stopping state without rotating.

It is judged whether one-half or more of the number of particles, i.e. 2000/2=1,000 particles, are included in the vicinity or not (template size×2). If the number of particles is one-half or lower, the flag is turned on in a manner similar to the above.

In case where the likelihood is extremely low, it is assumed that no moving object is present (emanated). The image tracking is terminated (Step 51), and it is turned to the waiting state. In case where the number of the particles is few, it is assumed that the particles are split to a plurality of likelihoods, and it is also turned to the waiting state.

In this case, the camera is fixed at its position without revolving (i.e. without moving the camera) of the surveying device 1 until a moving object emerges. Or, in case where moving objects are intersecting each other (there are a plurality of moving objects), the camera waits by repeating the processing until it is decided which of the object should be selected.

(Step 50) From an aggregate of 2,000 particles obtained in the above, a weighted average value of the particles is calculated to find out the most suitable position of the moving object by using the particle filtering, and the coordinates of the image are outputted. Specifically, the weighted average value of the particles is not a mere average value of the particles, but an average value of all particles can be determined by performing calculation (coordinates×normalized likelihood) on each particle by giving emphasis on the particle with higher likelihood.

From the image coordinates thus calculated, a horizontal angle (H) and a vertical angle (V) are calculated so that the camera of the second image pickup unit 12 or the camera of the third image pickup unit 13 mounted on the surveying device 1 are directed to the moving object, and the procedure is terminated (Step 51).

In case of the prism tracking, prism searching is carried out based on the angles (H and V). If the prism is present, it is judged that the tracking has been successfully performed at its position (H, V) ultimately.

In case of the object tracking, the camera is directed to the position (H, V), and the object tracking is continued.

In the present embodiment, a reflector (prism) is used as the target, while the target is not limited to a reflector, and it may be so arranged that a target, which is visually characteristic, is provided and the target is tracked. In this case, the target may be designed in circular shape or in form of concentric circles by using color components of R (red), G (green) and B (blue) or the like, or a target painted with a paint containing a reflective material may be used.

Figure 9:
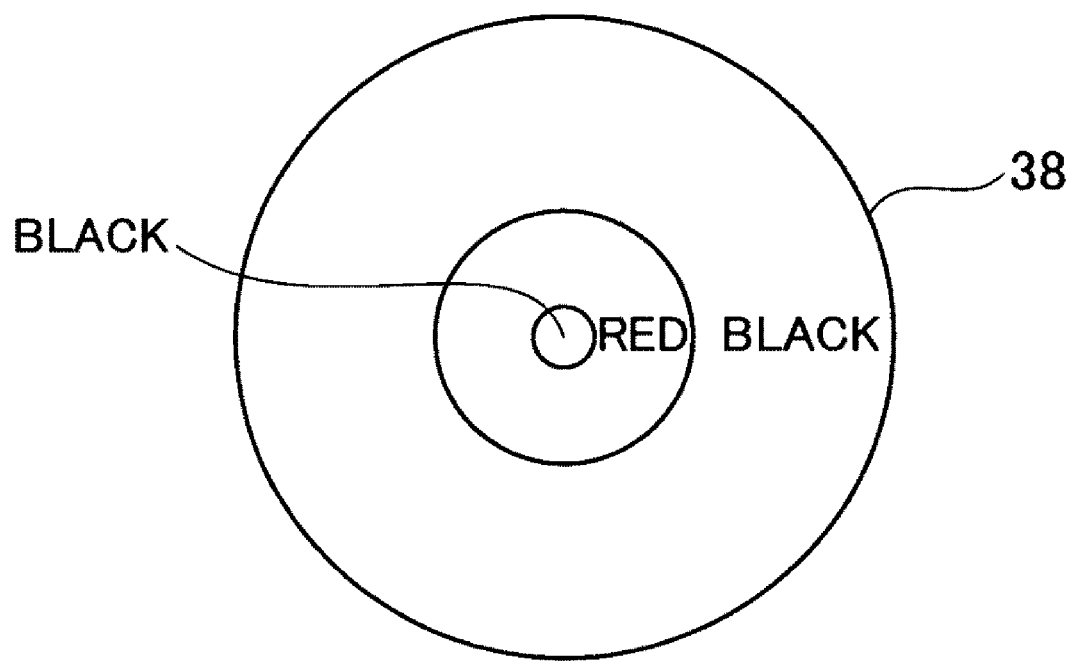
FIG. 9 is a drawing to show an example of a target to be used in the embodiment of the present invention.

FIG. 9 shows an example of a target 38 with three layers. Different colors are painted, i.e. the center (in black), the inner part (in red), and the outer part (in black). Tracking is performed on the moving object by the state estimation method (particle filtering), and it may be so arranged that this target 38 is tracked by other particle filtering or image processing or the like. That is, this means that, instead of performing the laser tracking in the present embodiment, the target is tracked (target tracking) by image processing. In this case, it is not necessarily needed to project a laser beam for target tracking, but the target can be more efficiently tracked by the image processing if a reflective material is used.

Also, the color in each region of the target 38 as shown in FIG. 9 can be changed as appropriate, and the target may be designed in two layers or in three layers or more.

Further, a light spot, which emits light, may be used as the target. In this case, it may be designed so that a light emitter (light source) to emit a light with a predetermined wavelength is provided on the moving object, and the target can be tracked in a manner similar to the case of the laser tracking by detecting the light of the light source by the image pickup units (one or all of the first, the second or the third image pickup units) in this present embodiment.

(Notes)

The following embodiments are included in the present invention:

(Note 1) A moving image tracking method and a device for the tracking, characterized in that, when an object reflector (prism) is missed (out of sight), the object reflector or a moving object (object such as a heavy machine, a person, etc.) including the object reflector is tracked by the state estimation method (particle filtering) based on the moving image (video), and even when the object reflector is missed under the conditions such as hiding, intersecting, vibration, etc. of the object reflector, the object reflector can be quickly detected by detecting the moving object, which is integrated with the object reflector, and operation can be carried out with higher working efficiency by reducing the time required until automatic tracking of the surveying operation can be restored.

(Note 2) A moving image tracking method and a device for the tracking, characterized in that, after designating an arbitrary moving object on an image, the moving object is automatically tracked by the state estimation method (particle filtering) based on the moving image, and measurement can be performed on three-dimensional locus of the moving object even when there is no specific object reflector.

(Note 3) A moving image tracking method and a device for the tracking, characterized in that, the state estimation method is a method to carry out tracking processing by using time series data of the moving image or the like, and the processing comprises a system (movement) model to represent the changes over time of the state and an observation model to represent observation process of particles, and the moving object is tracked while the feedback control is performed.

(Note 4) A moving image tracking method and a device for the tracking, characterized in that, a multiple of particles are generated around an object to be tracked, an image position of the object is obtained from a weighted average value of likelihood (amount of features) of the particles, and a moving object is ultimately recognized by performing prism searching from the image position.

(Note 5) A moving image tracking method and a device for the tracking, characterized in that, the system model uses an "equal velocity model" to accomplish smooth movement control of a moving object, and velocity and direction of the moving object are judged from distance measurement data (D) and angle measurement data (H, V) to the moving object acquired from the surveying device, and positions of generation of the particles to match the movement of the moving object are controlled.

(Note 6) A moving image tracking method and a device for the tracking, characterized in that, the observation model is a model for image processing of each of the particles generated according to a system model, the amount of features are calculated according to "histograms" based on color of the moving object and density gradient (edge) of the image or the like, the moving object is identified in stable manner even under the conditions of scale change, partial concealment, change in direction, etc. of the moving object, and robustness is attained.

(Note 7) A moving image tracking method and a device for the tracking, characterized in that, a tracked prism tracked or a part of an integrated moving object is used as a template for the image processing, and size and other features of the template are updated based on a distance measurement data acquired from the surveying device.

The invention claimed is:

1. An automatic tracking method, comprising detecting a light spot from a target supported on a moving object, taking a moving image of said target and said moving object, target tracking based on the detection of the light spot, performing image tracking based on said moving image in parallel to said target tracking, comparing a target position obtained by said target tracking with an image position obtained by said image tracking, and tracking based on a result of said target tracking in case where said target position and said image position are within a predetermined range.

2. The automatic tracking method according to claim 1, wherein said target tracking comprises projecting a laser beam and detecting said light spot based on a reflection light from said target supported on said moving object.

3. The automatic tracking method according to claim 1, wherein said target tracking comprises tracking a light emitting target for detecting said light spot caused by light emission of said target supported on said moving object.

4. The automatic tracking method according to claim 1, further comprising continuing said image tracking and performing a target search by projecting said laser beam to a predetermined range based on said image position in case where said target position and said image position are not within a predetermined range, or in case where said light spot is not detected and said target position cannot be obtained.

5. The automatic tracking method according to claim 1 or 4, wherein a template image is extracted from an image of said moving object in said moving image, a histogram is prepared from said template image, and said image tracking is carried out based on said histogram.

6. The automatic tracking method according to claim 5, wherein said histogram is a histogram of color or lightness.

7. The automatic tracking method according to claim 5, wherein said histogram is a histogram of gradient of edge obtained by edge processing.

8. The automatic tracking method according to claim 1 or 4, wherein particle filtering is used in said image tracking.

9. The automatic tracking method according to claim 8, wherein a multiple of particles are generated around said template image in said particle filtering, and a position of said template image is determined from a weighted average value of the particles.

10. The automatic tracking method according to claim 9, wherein velocity and moving direction of said moving object are judged based on distance measurement data and angle measurement data of said target, and generating position of the particles to match the movement of said moving object are controlled.

11. The automatic tracking method according to claim 9, wherein generation of the particles is controlled based on a difference between a position of a short time before and a position of the present position or based on a value of likelihood.

12. An automatic tracking method, comprising taking a moving image of a target supported on a moving object and of said moving object, a tracking said target based on said moving image, tracking said moving object based on said moving image, comparing a target position obtained from said target tracking step with a moving object position obtained from said moving object tracking step, and performing the target tracking based on a result of said tracking of said target in case where said target position and said moving object position are within a predetermined range.

13. A surveying device, comprising a first image pickup unit for receiving and detecting a reflection light from a target supported by a moving object, a moving image pickup unit for taking moving images of said target and said moving object, a drive unit for shifting collimating direction of said first image pickup unit and said moving image pickup unit to horizontal direction and vertical direction, a light spot detection processing unit for detecting a light spot based on an image from said first image pickup unit, an image tracking processing unit for performing image processing for image tracking based on a picked-up image of said moving image pickup unit, a control arithmetic unit for controlling said drive unit so that said first image pickup unit and said moving image pickup unit are directed toward the target based on the results of processing of said light spot detection processing unit and of said image tracking processing unit, wherein said control arithmetic unit controls said drive unit so that target tracking is performed based on the result of detection from said light spot detection processing unit, so that said image tracking is performed in parallel to said target tracking based on the result of processing from said image tracking processing unit, and so that said target is tracked based on a result of said target tracking in case where a target position obtained by said target tracking and a moving object position obtained from said image tracking are within a predetermined range.

14. The surveying device according to claim 13, wherein said target tracking is a laser tracking for projecting a laser beam and for detecting a reflection light from said target supported on said moving object.

15. The surveying device according to claim 13, wherein said target tracking is a light emitting target tracking for detecting said light spot based on light emission of said target supported on said moving object.

16. The surveying device according to claim 14, wherein said control arithmetic unit recognizes said target based on the result obtained by said laser tracking in case where said light spot position obtained by said laser tracking and said image position obtained by said image tracking are within a predetermined range.

17. The surveying device according to claim 14, wherein said control arithmetic unit controls said drive unit so that searching is performed by a laser beam over a predetermined range based on an image position obtained by said image tracking and so that said target is detected in case where said light spot position obtained by said laser tracking and said image position obtained by said image tracking are not within a predetermined range or in case where said light spot position cannot be obtained.

18. The surveying device according to claim 13, wherein said control arithmetic unit has a program for particle filtering processing, and said image tracking processing unit carries out image tracking processing by the particle filtering.

19. The surveying device according to claim 13, wherein said control arithmetic unit extracts a moving object image from an image of said moving image pickup unit, generates a histogram from said moving object image, and identifies the moving object based on said histogram.

20. The surveying device according to claim 18, wherein said control arithmetic unit generates a multiple of particles around the moving object image by said particle filtering and determines image position based on a weighted average value of likelihoods of said particles.

21. The surveying device according to claim 18, wherein said control arithmetic unit judges velocity and moving direction of said moving object based on distance measurement data and angle measurement data and controls generation of particles according to the movement of said moving object.

22. The surveying device according to claim 20 or 21, wherein said control arithmetic unit controls generation of particles based on a difference between a position of a short time before and the present position or based on the value of likelihood.

23. The surveying device according to claim 19, wherein said histogram is at least one of a color histogram, a lightness histogram or a histogram of edge gradient.

24. A surveying device comprising a first image pickup unit for taking a moving image of a target supported on a moving object, a moving image pickup unit for taking moving images of said target and said moving object, a drive unit for shifting collimating direction of said first image pickup unit and said moving image pickup unit to horizontal direction and to vertical direction, a target tracking image processing unit for performing tracking of said target based on an image from said first image pickup unit, a moving object image tracking processing unit for performing tracking on said moving object based on said moving image, and a control arithmetic unit for controlling said drive unit so that said first image pickup unit and said moving image pickup unit are directed toward the target based on a result of processing of said target tracking image processing unit and said moving object image processing unit, wherein said control arithmetic unit controls said drive unit so that tracking of the target is carried out based on a result of detection from said target tracking image processing unit, so that the tracking on said moving object is carried out in parallel to said target tracking based on a result of processing from said moving object image tracking processing unit, and so that said target is tracked based on a result of said target tracking in a case where a target position obtained by said target tracking and a moving object position obtained from said image tracking are within a predetermined range.

* * * * *